US008660607B2

(12) United States Patent
Infanti et al.

(10) Patent No.: US 8,660,607 B2
(45) Date of Patent: Feb. 25, 2014

(54) APPARATUS, SYSTEM AND METHOD FOR REMOTE OPERATION OF A MOBILE COMMUNICATION DEVICE

(75) Inventors: James Carl Infanti, Waterloo (CA); Timothy Herbert Kyowski, Kitchener (CA); Sherry Marie O'Brien, Kitchener (CA); Ming-Lun Dave Ma, Kitchener (CA)

(73) Assignee: BlackBerry Limited, Waterloo (CA)

( * ) Notice: Subject to any disclaimer, the term of this patent is extended or adjusted under 35 U.S.C. 154(b) by 493 days.

(21) Appl. No.: 12/978,498

(22) Filed: Dec. 24, 2010

(65) Prior Publication Data

US 2012/0164956 A1 Jun. 28, 2012

(51) Int. Cl.
*H04B 1/38* (2006.01)
(52) U.S. Cl.
USPC ............ 455/557; 455/556.1; 455/575.1; 345/1.1
(58) Field of Classification Search
USPC ........... 455/557, 556.1, 575.1, 575.3, 3.03, 455/419; 345/1.1, 650
See application file for complete search history.

(56) References Cited

U.S. PATENT DOCUMENTS

| 2002/0158811 | A1* | 10/2002 | Davis | 345/1.1 |
| 2006/0046706 | A1* | 3/2006 | Lin et al. | 455/420 |
| 2006/0160570 | A1* | 7/2006 | Kamarainen | 455/557 |
| 2007/0162576 | A1 | 7/2007 | Sinclair et al. | |
| 2007/0224980 | A1 | 9/2007 | Wakefield | |
| 2008/0291225 | A1* | 11/2008 | Arneson | 345/698 |
| 2009/0201223 | A1 | 8/2009 | Stephens | |
| 2010/0050261 | A1* | 2/2010 | Park | 726/24 |
| 2010/0060664 | A1* | 3/2010 | Kilpatrick et al. | 345/650 |
| 2010/0064244 | A1* | 3/2010 | Kilpatrick et al. | 715/773 |
| 2012/0004923 | A2* | 1/2012 | Gaines et al. | 705/1.1 |
| 2012/0030567 | A1* | 2/2012 | Victor | 715/702 |
| 2012/0083153 | A1* | 4/2012 | Schmidt | 439/527 |
| 2012/0176741 | A1* | 7/2012 | Wu et al. | 361/679.09 |
| 2013/0053097 | A1* | 2/2013 | Phillips | 455/556.1 |

FOREIGN PATENT DOCUMENTS

EP 1725003 A1 11/2006

OTHER PUBLICATIONS

Website, http://besttabletreview.com/the-asus-eee-reader-gets-details-eeebook/, Accessed Dec. 24, 2010.
Website, http://www.engadget.com/2009/09/07/asus-planning-dual-screen-eee-reader-worlds-cheapest-e-book-re/, accessed Dec. 24, 2010.
Website, http://www.wired.com/gadgetlab/2009/10/edge-e-reader-netbook/, accessed Dec. 24, 2010.
Website, http://www.entourageedge.com/entourage-edge.html, accessed Dec. 24, 2010.

(Continued)

*Primary Examiner* — Minh D Dao
(74) *Attorney, Agent, or Firm* — MBM Intellectual Property Law, LLP

(57) ABSTRACT

Method, system, and device for remote operation of a wireless communication device. The method for remote operation of a wireless communication device using an accessory involves establishing a communication channel between the accessory and the wireless communication device, providing output to a user on the accessory, receiving user input on the accessory, processing the user input and generating control signals for transmission to the wireless communication device to initiate one or more actions on the wireless communication device. The accessory comprises a touchscreen for presenting information to a user and receiving user input. The accessory may optionally be a hinged accessory with a dual touchscreen.

14 Claims, 10 Drawing Sheets

(56) References Cited

OTHER PUBLICATIONS

McColl, Colleen, "MSI dual-screen e-reader and netbook runs Windows 7," http://www.mobilemag.com/2010/01/07/msi-dual-screen-e-reader-and-netbook-runs-windows-7/ (accessed Jan. 7, 2011).
Website, http://www.geekologie.com/2006/06/turnover_ereader_simulates_a_b.php, accessed Jan. 7, 2011.
Website, http://gadgetmix.com/index/astri-ebook-reader-dual-screen/, accessed Jan. 7, 2011.
Website, http://www.celiocorp.com/companion, accessed Jan. 7, 2011.
Website, http://www.thinkgeek.com/computing/usb-gadgets/bfa3/, accessed Jan. 7, 2011.

\* cited by examiner

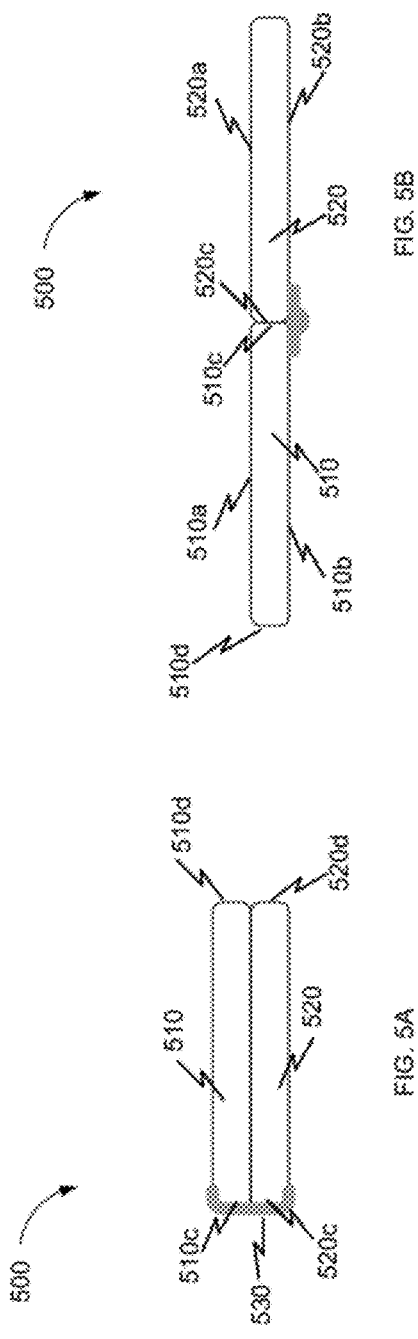
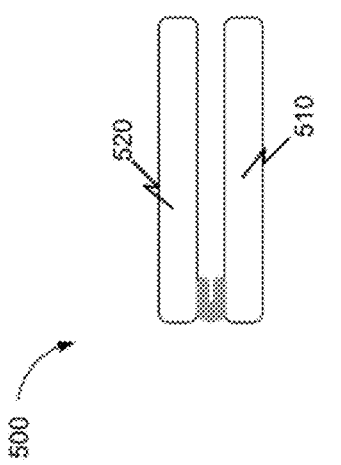
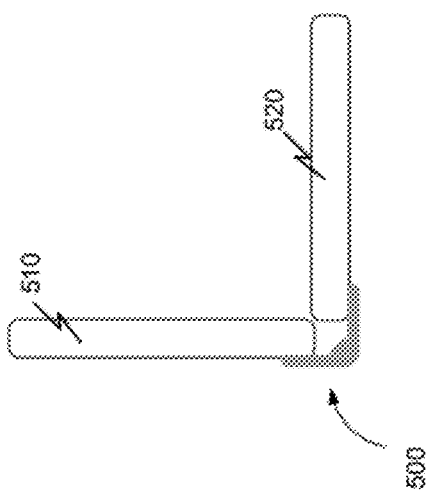
FIG. 5

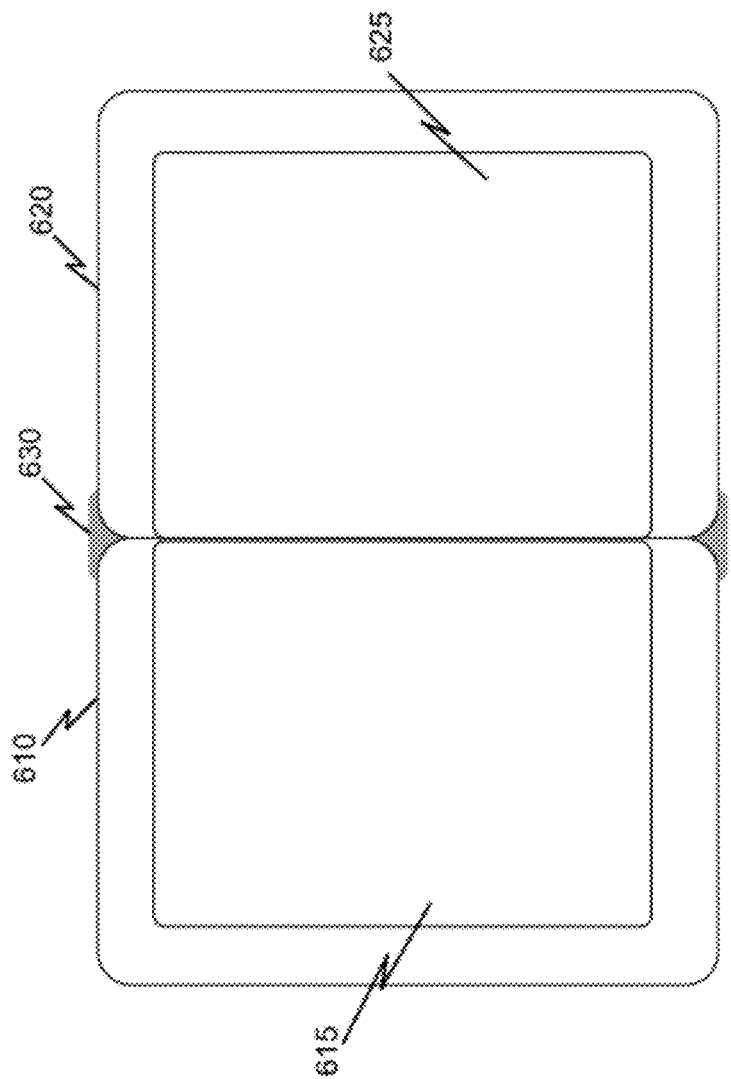

APPARATUS, SYSTEM AND METHOD FOR REMOTE OPERATION OF A MOBILE COMMUNICATION DEVICE

CROSS-REFERENCE TO RELATED APPLICATIONS

This is the first application filed for the present technology.

TECHNICAL FIELD

The present disclosure relates generally to mobile electronic devices and, in particular, to remote operation of mobile devices using an accessory.

BACKGROUND

Wireless communication devices such as cellular telephones, handheld PDAs, and the like, are now capable of supporting a variety of applications for performing a range of functions such as navigation, web-browsing, electronic books, and the like. For convenience and portability, such mobile devices are also progressively becoming smaller in physical size. It is, however, often inconvenient to use the small screen provided on a mobile devices for extended periods of time or for viewing minute details.

It would be desirable to use the functionality of a wireless communication devices such as the GPS navigation and mapping functions or web-browsing function using an accessory that has both input and output functionality and a screen larger than the wireless communication device screen.

BRIEF DESCRIPTION OF THE DRAWINGS

Further features and advantages of the present technology will become apparent from the following detailed description, taken in combination with the appended drawings, in which:

FIG. 5 shows a side view of an exemplary hinged accessory in accordance with some embodiments of the present invention;

FIG. 6 shows an exemplary embodiment of a hinged accessory with a dual touchscreen display;

FIG. 7(*b*) shows exemplary hinged dual touchscreen accessory with the dual touchscreens functioning as individual screens in accordance with some embodiments of the present technology;

It will be noted that throughout the appended drawings, like features are identified by like reference numerals.

DETAILED DESCRIPTION

The present technology generally provides a method, system, device, wireless communication device and computer program product for remote operation of a wireless communication device using an accessory.

Accordingly, an aspect of the present technology is a method comprising the acts of establishing a communication channel between the accessory and the wireless communication device; presenting information to a user on the accessory; receiving user input on the accessory; processing the received user input, generating one or more control signals for the initiation of one or more actions on the mobile device, and initiating one or more actions on the wireless communication device in response to the one or more control signals. The control signals are generated, at least in part, based on user input received on the accessory.

Another aspect of the present technology is a computer program product comprising code adapted to perform acts associated with the foregoing method when the code is loaded into memory and executed on a processor of a wireless communications device.

Yet another aspect of the present technology is an system configured for remote operation of a wireless communication device. The system comprises an accessory, a wireless communication device, a communication interface for communicatively coupling the wireless communication device and the accessory and processing module.

Yet another aspect of the present technology is an accessory configured to remotely operate a wireless communication device. The accessory comprises a touchscreen display, a communication interface and a controller communicatively coupled to the touchscreen and the communication interface.

Yet another aspect of the present technology is a wireless communications device configured to be remotely operated by an accessory.

The details and particulars of these aspects of the technology will now be described below, by way of example, with reference to the attached drawings.

Method

Figure 1:
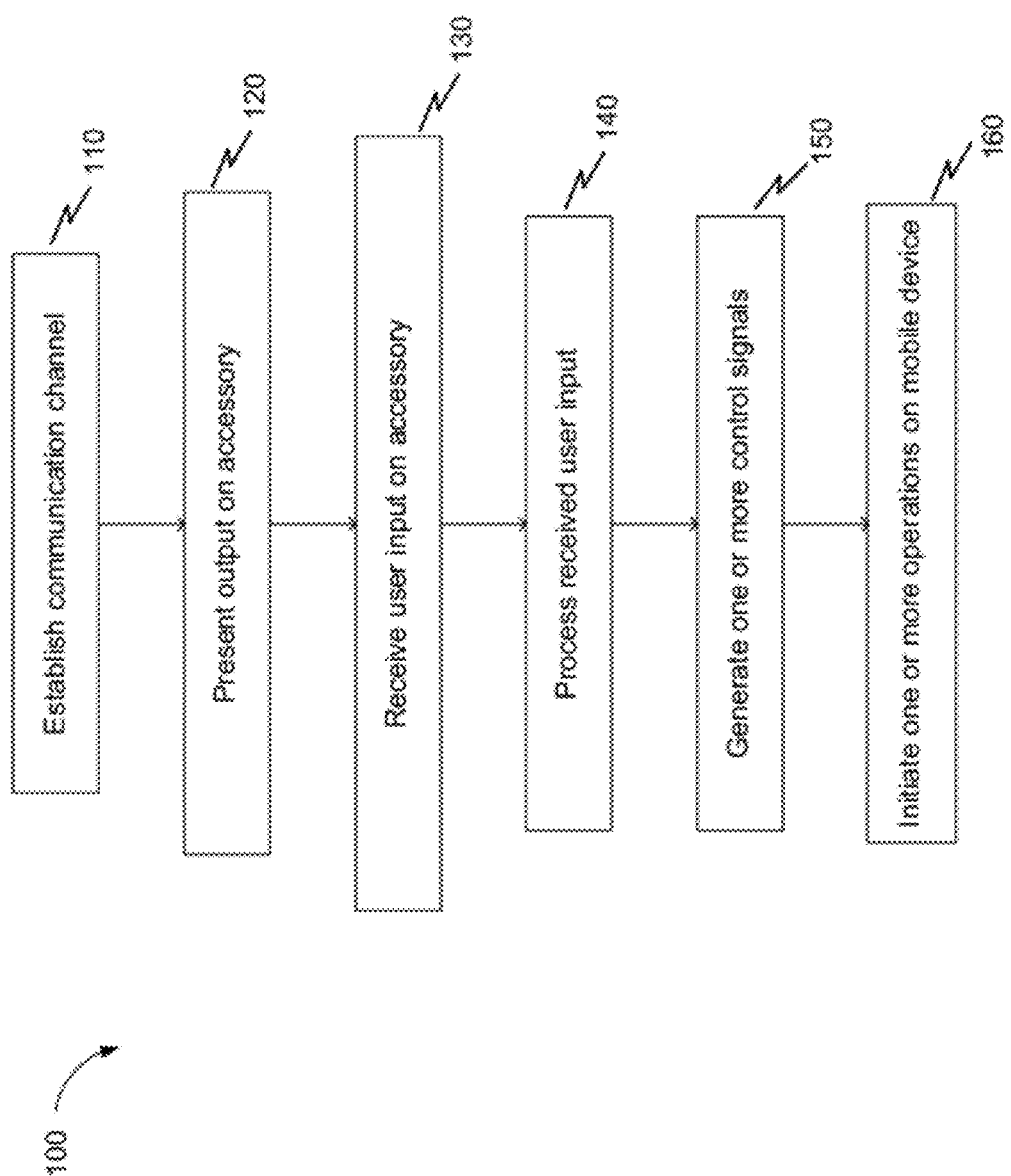
FIG. 1 illustrates a flowchart of the steps of a method for remote operation of a mobile device using an accessory in accordance with some embodiments of the present technology.

FIG. 1 illustrates a method for remote operation of a wireless communication device using an accessory comprising a touchscreen display in accordance with some embodiments of the present technology. Referring to FIG. 1, the method 100 comprises establishing 110 a communication channel; presenting 120 information to a user on the accessory; receiving 130 user input on the accessory; processing 140 the received user input; generating 150 one or more control signals for the initiation of one or more actions on the mobile device, and initiating 160 one or more actions on the mobile device in response to the one or more control signals. The control signals are generated, at least in part, based on user input received on the accessory.

Exemplarily, a wireless communication channel is established for communication between the accessory and the wireless communication device. The wireless communication may be achieved using a Bluetooth™ communication protocol, for example. The touchscreen display, exemplarily, presents a start-up screen listing different options such as "read e-book", "make phone call" and "browse internet" to a user. The user exemplarily selects "read e-book" from the options presented by touching the appropriate region on the touch screen display. The user's selection is received and processed and appropriate control signals are sent to the wireless communication device to retrieve an e-book from the user's account on an on-line store. The mobile device accesses the user's account by connecting to the internet via its wide-area wireless communication channel. The text of the e-book, obtained from the online store, is then sent from the mobile device to the accessory and displayed on the touchscreen display for viewing by the user.

In some embodiments, the method of remote operation of the wireless communication device comprises storing data during the remote operation. The data may be data created at the accessory during the remote operation of the wireless communication device or obtained from the wireless communication device. For example, data may comprise text of an email message composed by a user of the accessory or an e-book obtained from the mobile device. In some embodiments, the data is only stored in the accessory. In some embodiments, the data is only stored in the wireless communication device. In some embodiments, the data is stored in the accessory as well as the wireless communication device.

In some embodiments, when the accessory is disconnected from the wireless communication device, data stored in the wireless communication is deleted. In some embodiments, stored data remains in the accessory after it is disconnected from the mobile device. In some embodiments, data stored in the accessory is transferred to the wireless communication device before the accessory is disconnected from the mobile device. In some embodiments, data stored in the accessory is transferred to the wireless communication device and deleted from the accessory before it is disconnected from the wireless communication device. Storage and storage location for data may be based on factors such as user preference, privacy settings, memory capacity, and the like.

Establishing a Communication Channel

In some embodiments, the communication between the accessory and mobile device is via a short-range communication channel and protocol. The short-range communication channel may be wired or wireless. Examples of short-range communication include USB, Bluetooth™, Zigbee, WiFi, infrared, near field communication (NFC) and the like.

In some embodiments, the accessory and the mobile device may be enabled for a plurality of communication channels and protocols. In some embodiments, the communication channel and protocol used may be based on factors such as user preference, bandwidth, upload speed, download speed, desired data rate, security and the like. In some embodiments, the communication channel used may be based on the actions being performed. For example, the Bluetooth communication channel may be used for a phone conversation while WiFi is used for accessing email from the mobile device.

In some embodiments, establishing a communication channel between the accessory and the mobile device comprises authentication or verification of the user, the accessory, or both. In some embodiments, authentication may be required on one or both of the accessory and the mobile device. Authentication may be performed using any methods or standards that will be readily known to a worker skilled in the art. Authentication procedures may be single-factor or multi-factor authentication. Authentication may be knowledge based using username, password, security questions, and the like. For example, a user of the accessory wishing to access the mobile device may be required to log in using a password. Authentication may be ownership factor base using cards, tokens, bands and the like. Authentication may be inherence-based, for example, using biometric identification of fingerprint scanning, facial scanning, retinal scanning, voice recognition and the like.

In some embodiments, multiple levels or categories of authorization may be allowed for the accessory or user. The different levels of authorization may be related to different levels of access allowed on the mobile device. For example, one authorization level may allow a user to access all the functions on the mobile device including allowing the user to change the settings or delete information on the mobile device while another level of authorization may allow a user to access the functions without allowing any setting modifications or data deletions. As another example, different categories of authorization may allow use of a different subset of the functions available on the mobile device.

In some embodiments, authentication may be required when initiating particular operations or actions. For example, a user may be allowed to access music files stored on the mobile device with the initial general authentication procedure but access to email communications may require an additional authentication step.

In some embodiments, establishing a communication channel comprises establishing a secure communication channel. In some embodiments, establishing a secure communication channel comprises establishing an encryption protocol for communication between the mobile device and accessory. Any standard or proprietary encryption protocol readily know to a worker skilled in the art may be used. Examples include symmetric key, asymmetric key, secure sockets layer, transport layer security, and the like.

Presenting Output on the Accessory

Output information is presented for a user on the accessory. In some embodiments, the output information is presented on the touchscreen display. For example, the touchscreen may display a list of options such as "make phone call", "browse web", "photo album", etc. The user can then make a selection by touching the appropriate section of the screen. In some embodiments, output information may additionally be presented via other output modules associated with or comprised in the accessory such as speakers, indicators and the like.

Figure 2:
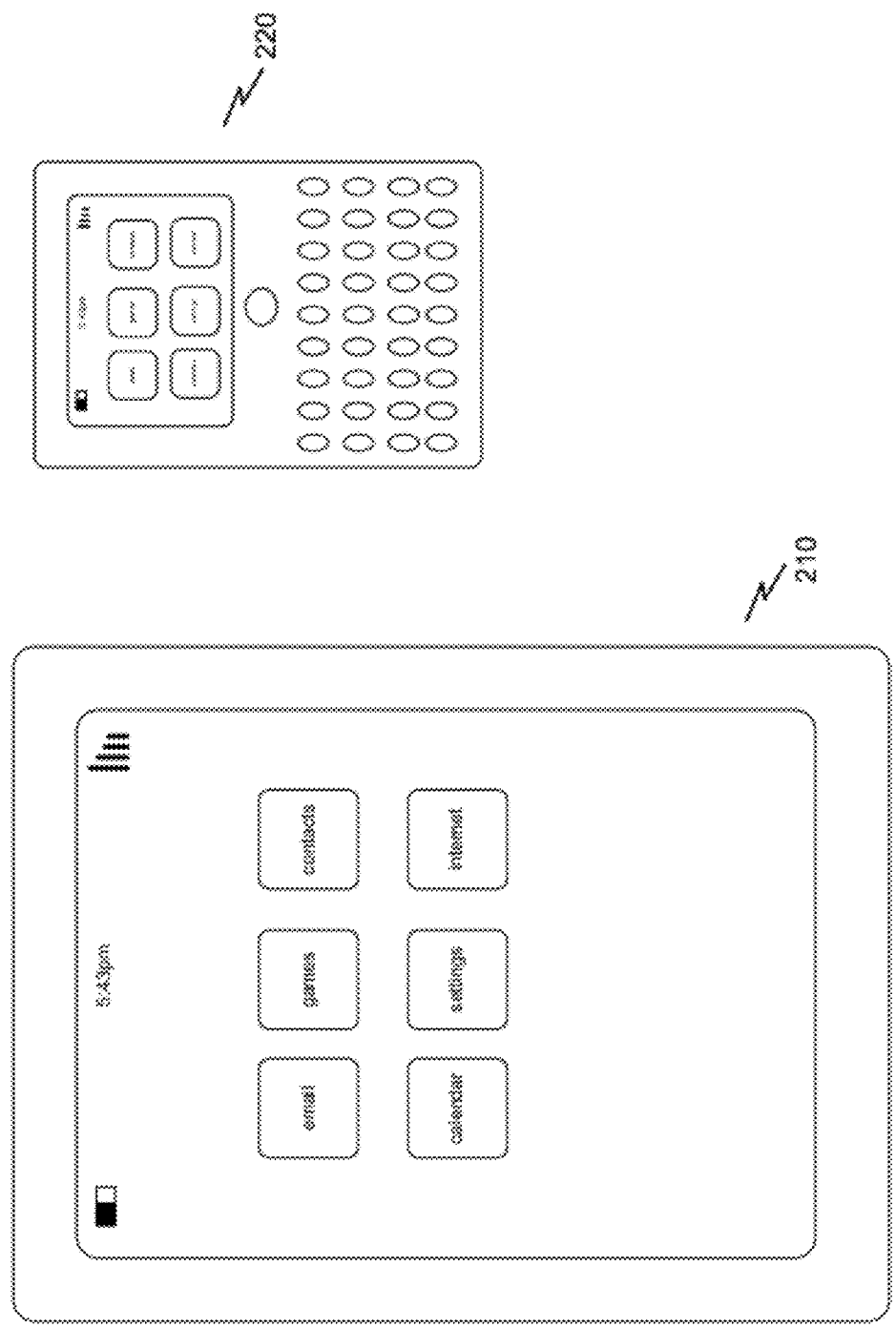
FIG. 2 illustrates an exemplary embodiment of the touchscreen display of an accessory in accordance with some embodiments of the present technology.

In some embodiments, when a connection is established between the mobile device and the touchscreen, the information initially displayed on the touchscreen may be indicative of the mobile device, for example, presenting the same screen as displayed the mobile device screen. FIG. 2 illustrates an exemplary embodiment of the touchscreen display of an accessory in accordance with some embodiments of the present technology. In this exemplary embodiment, the touchscreen display 210 is the same as the mobile device display screen 220 showing functions available on the mobile device such as music, email, photos, books, contacts, web, and the like.

In some embodiments, the output presented on the touchscreen display is customized for the accessory, user or both. For example, the screen design, screen layout, menu choices listed, and language may be customized. The customization may be based on factors such as user preferences, settings, authorization level, bandwidth availability, battery level, and the like.

During remote operation of the mobile device by the accessory, the output presented on the accessory touchscreen may be the same or different from that displayed on the mobile device screen. In some embodiments, the output is updated only on the accessory. Accordingly, in some embodiments, the mobile device screen is not updated while it is being remotely operated by the accessory. In some embodiments, the output may be presented on the accessory as well as the mobile device. For example, when a user on an accessory selects to view a particular photograph stored on the mobile device, the photo is displayed on the screen of the accessory and may additionally be displayed on the mobile device screen. This may be useful for example, if two people want to view the photos at the same time.

Receiving User Input on Accessory

User input is received on the accessory via one or more user interfaces included in the accessory or external devices associated with the accessory. In some embodiments, user input is received via the touchscreen display when the user touches the appropriate section on the screen. For example, the user may touch an item on a menu to make a selection, or type text using a keyboard presented on the screen.

In some embodiments, the user input may comprise input received on other input/output interfaces included in or associated with the accessory such as a microphone, keyboard, camera, joystick and the like. For example, the input may be audio input when the user is engaged in a phone call or chooses to make his selection by speech rather than touch. As another example, the input may be received via a joystick externally connected to the accessory when a user is operating the gaming function of the mobile device.

In some embodiments, user input may be received on the accessory as well as the mobile device. For example, a first (remote) user may be remotely operating the mobile device using the accessory while a second (local) user is operating the mobile device locally. Exemplarily, the users may be engaged in a game, the game may be stored on the mobile device or it may be an online game. As another example, the both users may be engaged in a phone call being conducted with a third person using the wireless communication functionality of the mobile device. As yet another example, the remote user may be accessing the mobile device to view photos stored on the mobile device while the local user of the mobile device is engaged in a phone call.

In some embodiments, the mobile device or the accessory may be "locked" from receiving user input. For example, output may be presented on the accessory touchscreen as well as the mobile device screen but user input may be received only on the accessory touchscreen.

Processing Received User Input

The user input received on the accessory may be processed by the accessory, by the mobile device after it is sent from the accessory to the mobile device, or by both the accessory and the mobile device. Processing may comprise compressing, filtering, encrypting, formatting, translating or any other data processing operation readily understood by a worker skilled in the art.

Processing user input may comprise determining actions to be performed in response to the received user input. In some embodiments, processing of user input may comprise determining whether information has to be sent or retrieved from the mobile device or from a peer mobile device, networked terminal or server. For example, when a user selects "next page" while reading an electronic book on the accessory, the selection is processed to determine if the next page data is available in the accessory, exemplarily in a buffer memory, or if the next page data has to be retrieved from the mobile device. The next page data may additionally be retrieved by from a remote web server by the mobile device. Accordingly, processing the user input comprises determining whether additional data has to be retrieved and additional control signals have to be formulated.

In some embodiments, processing the received user input may comprise processing of user input data for transmission. Transmission may be from the accessory to the mobile device or from the mobile device to a peer mobile device, networked terminal or server. For example, when the user of the accessory is engaged in a phone call, the accessory processes the audio input for transmission to the mobile device via the established communication channel. The audio input may be filtered, compressed and converted to a format accepted by the mobile device. The data may additionally be processed to enable buffered transmission. Similarly, user input may also be processed for transmission from the mobile device to a networked terminal or server.

Generating Control Signals and Initiating One or More Actions on Mobile Device

Control signals are generated to initiate one or more actions on the mobile device. The control signals are based at least in part on the user input received on the accessory. For example, when a user makes a selection on the touchscreen, an appropriate control signal is generated, based on the user's selection, to instruct the mobile device to initiate an action such as making a phone call or opening a particular photo album.

The user input is processed to determine the actions to be initiated on the mobile device and appropriate control signals are generated accordingly. In some embodiments, the control signals may be generated in the accessory. In some embodiments, the user input is transmitted to the mobile device and appropriate control signals are accordingly generated at the mobile device.

A worker skilled in the art will be familiar with suitable protocols and schemes for generating, transmitting and receiving control signals. Control signals, as used herein, represent control commands comprising instructions, information or both to perform particular actions. In some embodiments, control signals are configured in a format specific to the device sending the control signals and may be accordingly interpreted by the device receiving the signals. Alternately, the control signals may be configured in a format specific to the receiver device. Control signals may be transmitted in the same channels as data or on a different channel. Control signals may be transmitted contained within the data packets or in separate packets.

One or more actions may be initiated on the mobile device in response to control signals generated based at least in part on user input.

In some embodiments, an action may comprise launching of an application such as the navigation application on the mobile device. In some embodiments, an action may comprise configuring or changing a setting on the mobile device. For example, the ringer volume of the mobile device may be set to mute. In some embodiments, an action may comprise accessing data on the mobile device. For example, the address book of the mobile device may be accessed. In some embodiments, an action may comprise providing data to the mobile device. For example, a new entry may be added to the address book on the mobile device.

Transferring Data Between the Accessory and the Mobile Device

While the accessory is connected to the mobile device, data and control signals are transferred between the mobile device and accessory. In some embodiments, data transfer between the accessory and mobile device occurs via one or more short-range communication channel and protocol.

Data transferred may include textual data, audio data, visual data and combinations thereof. Data may be obtained, stored and transmitted in any standard or proprietary format.

Data may be acquired at a suitable sample rate and transmitted at a suitable bitrate which may be different for different sources or types of data. Data transmission may optionally be buffered. Data may be obtained in one format and converted to another format for storing, transmitting or processing. A worker skilled in the art will be familiar with different formats for storing and transmitting different types of data.

The rate of sampling, transmission and buffering as well as the choice of formats for storing or transmission may be based on factors such as available bandwidth, memory capacity, processing capabilities, user activity, battery level and the like.

In some embodiments, data includes audio data. Audio data may be obtained, stored and transmitted in a proprietary or standard digital format, as would be readily understood by a worker skilled in the art. Digital formats for audio data include uncompressed formats such as WAV, AIFF and the like. Digital formats for audio files include compressed formats such as MP3, MP4, wma, msv, gsm, vox, dct, aac, m4p, amr, awb and the like. Selection of audio file formats may be based at least in part on the type of audio data, processing capability and available bandwidth capabilities, and may be device dependent, for example.

In some embodiments, data includes visual data. Visual data may be obtained, stored and transmitted in a proprietary or standard digital image format, as would be readily understood by a worker skilled in the art. Standard digital formats for still images include raster formats such as Joint Photographic Experts Group File Interchange Format (JPEG/JFIF), Tagged Image File Format (TIFF), raw image formats, Graphics Interchange Format (GIF), Tagged Image File Format (TIFF), Bitmap and the like, and vector formats, such as Computer Graphics Metafile (CGM), Scalable Vector Graphics (SVG), Encapsulated Postscript (EPS), Windows Metafile (WMF), Enhanced Metafile (EMF) and the like. Standard digital formats for moving images include H-261, Theora and Moving Picture Experts Group (MPEG) formats such as MPEG-1, MPEG-2, MPEG-4 and the like.

In some embodiments, data includes text data. Text data may be obtained, stored and transmitted in a proprietary or standard digital format, as would be readily understood by a worker skilled in the art. Examples of text data formats include plain text, txt, doc, rtf, PDF, html and the like.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communications device.

Acts associated with the method described herein can be implemented as coded instructions in plural computer program products. For example, a first portion of the method may be performed using one wireless communication device, and a second portion of the method may be performed using another wireless communication device, server, or the like. In this case, each computer program product is a computer-readable medium upon which software code is recorded to execute appropriate portions of the method when a computer program product is loaded into memory and executed on the microprocessor of a wireless communications device.

System

Figure 3:
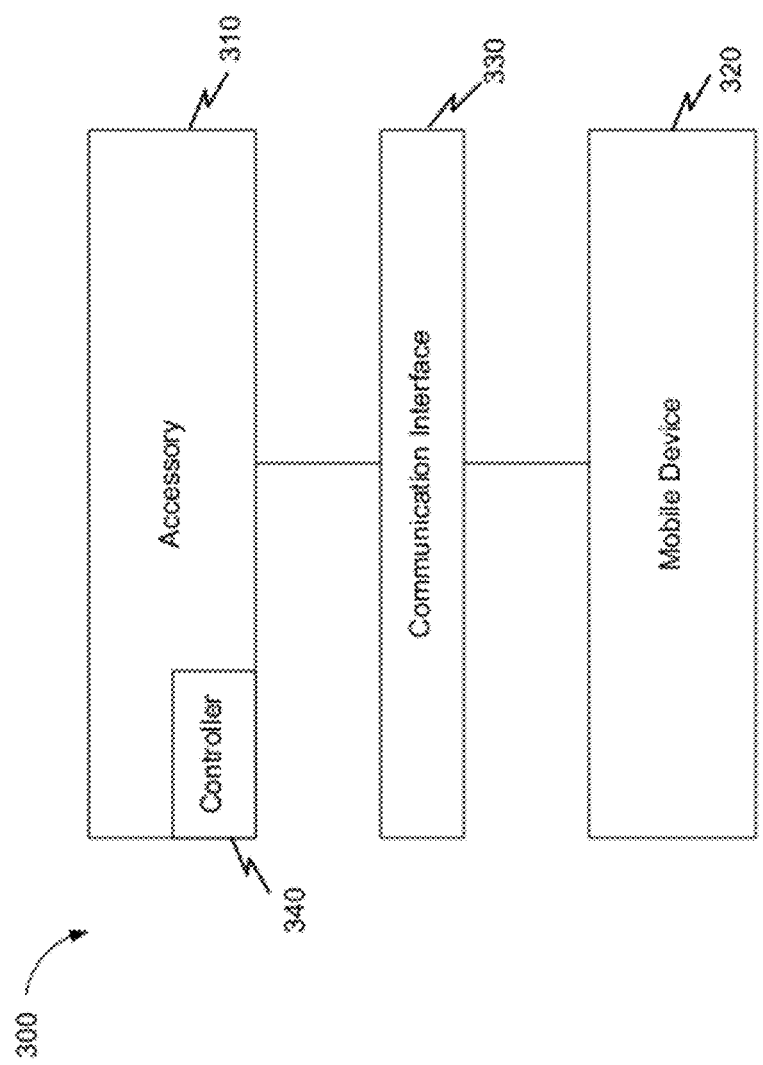
FIG. 3 is a schematic block diagram of an exemplary system for remote operation of a mobile device by an accessory in accordance with some embodiments of the present technology.

FIG. 3 is a schematic block diagram of an exemplary system 300 for remote operation of a mobile device by an accessory in accordance with some embodiments of the present technology. The system comprises an accessory 310, a mobile device 320, and a communication interface 330. The accessory 310 is configured for remote operation of a mobile device 320. The mobile device 320 is configured to be remotely operated by the accessory 310. The communication interface 330 communicatively couples the accessory 310 and the mobile device 320. The accessory 310 includes a touchscreen display configured to present output and receive user input. The accessory further comprises a controller 340 configured to process the received user input and generate one or more control signals for transmission to the mobile device. The control signals are generated, at least in part, based on the received user input. The mobile device 320 is configured to initiate one or more actions based at least in part on the one or more control signals.

In some embodiments, a plurality of accessories may be linked to the mobile device 320. In some embodiments, an accessory may be additionally linked to one or more external devices via the communication interface.

Accessory

As used herein, an accessory is an electronic device externally connected to a mobile device.

Figure 4:
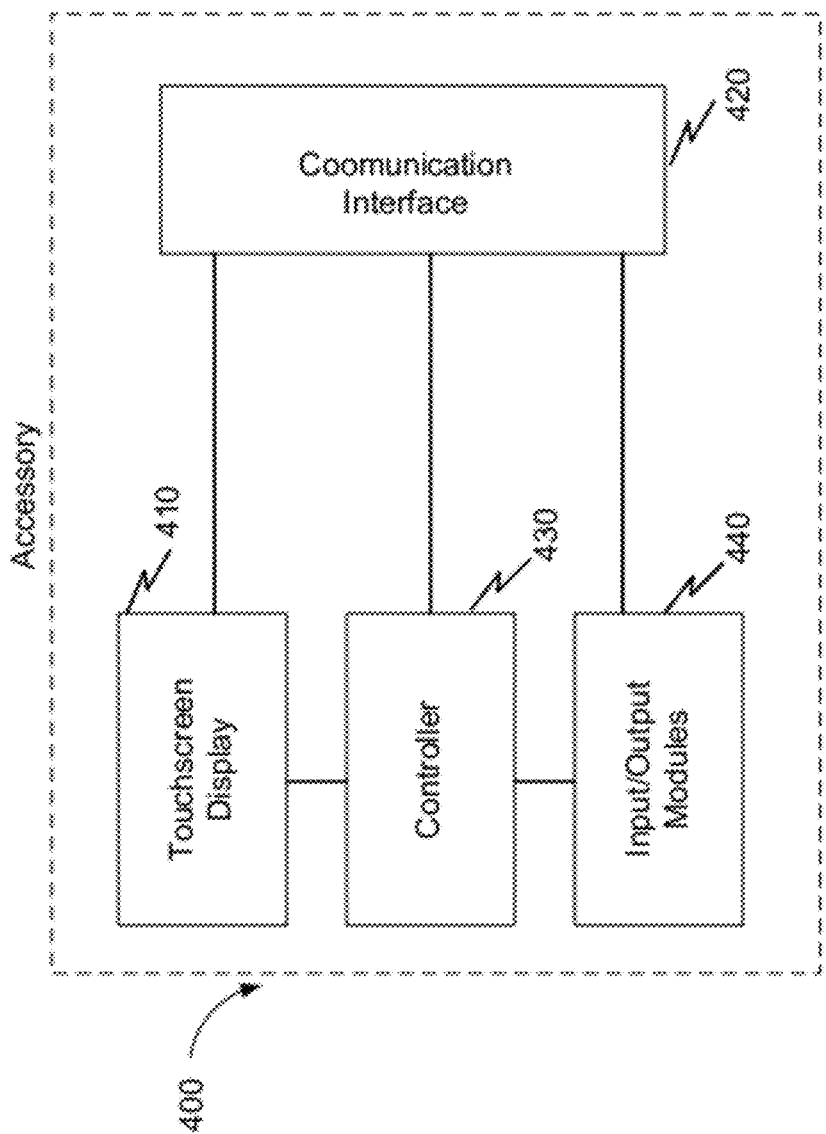
FIG. 4 is a schematic block diagram of an exemplary accessory in accordance with some embodiments of the present technology.

FIG. 4 is a schematic block diagram of an exemplary accessory 400 in accordance with some embodiments of the present technology. The accessory 400 comprises a touchscreen display module 410 coupled to a communication interface 420. The accessory 400 further comprises a controller 430 operatively coupled to the touchscreen display 410 and the communication interface 420.

The accessory 400 is configured for remote operation of the mobile device. The accessory 400 is configured to interface with a user and communicate with the mobile device thereby allowing the user to remotely operate the mobile device.

The accessory 400 presents an output to a user and receives user input from the user via the touchscreen display 410. The accessory 400 sends and receives data and control signals to and from the mobile device via the communication interface 420. The controller 430 is configured to generate one or more control signals for transmission to the mobile device. The one or more control signals are based at least in part on the received user input.

In some embodiments, the controller 430 is configured to process different types of data using one or more processors. In some embodiments, the controller 430 is further configured to control and coordinate the functioning of various modules on the accessory 400.

In some embodiments, the controller 430 is configured to process received user input. In some embodiments, the controller is configured to provide the processed user input to the mobile device. In some embodiments, the controller is configured to determine the data to be sent to or requested from the mobile device.

In some embodiments, the controller 430 is configured to process data received from the mobile device. In some embodiments, the controller 430 is further configured to provide the processed data to the touchscreen display 410 for output to the user. For example, the output on the touchscreen display may include a combination of information received from the mobile device, stored information, information input by the user and the like.

The controller 430 comprises or is operatively associated with one or more memory modules (in the form of RAM or flash memory or both). A memory module may be configured to store an operating system comprising information and executable code that enables the accessory to perform a set of functions. Operating systems may include software, firmware, and other information for enabling a variety of functions on the accessory and other connected external devices. In some embodiments, in addition to the operating system, the accessory may additionally comprise one or more software applications, stored on one or more memory modules, configured to perform functions or tasks as will be readily understood by a worker skilled in the art. Exemplarily, the applications include web-browsing applications such as Firefox™, word processing applications such as Microsoft Word™ and the like. In some embodiments, one or more of the memory modules may also be a mass storage memory module for storing data and configured for read/write operations.

The touchscreen display 410 may be based on any touchscreen technology that will be readily known to a worker skilled in the art. Examples of touchscreen technology include resistive, capacitive, surface acoustic wave, surface capacitance, projected capacitance, mutual capacitance, self capacitance, infrared, strain gauge, optical sensors, dispersive signal, acoustic pulse recognition and the like. The touchscreen display may be configured to be operated by direct contact by a user (using the finger), indirectly (using a stylus and the like), or both. In some embodiments, the controller 430 is integrated with the touchscreen display 410. In some embodiments, the controller is the touchscreen display module.

The communication interface 420 comprises one or more communication modules, each using an associated communication protocol to send and receive data and control signals to and from the mobile device. The communication interface 420 optionally also allows the accessory to communicate with other similarly enabled external devices such as a printer, fax, an stereo, camera and the like.

Each communication module is configured to communicate with the mobile device using an associated communication protocol and one or more associated communication channels. The communication protocols may be any standard or proprietary protocols readily known to a worker skilled in the art. The communication channels may be wired or wireless.

In some embodiments, the communication interface is configured to communicate with the mobile device using a short-range communication channel and protocol. Examples of short-range communication include Bluetooth™, WiFi, infrared, near field communication (NFC) and the like. In some embodiments, the communication interface is further configured to communicate with the mobile device using a long-range communication protocol. Examples of long-range communication include radio-frequency communication, microwave communication and the like.

In some embodiments, the accessory may be configured to send data and control signals to the mobile device using a first communication channel and associated first communication protocol, and to receive control signals and data from the mobile device using a second communication channel and associated second communication protocol.

In some embodiments, the accessory may comprise one or more additional input/output modules for present output to the user, receiving input from the user, or both. Examples of input/output modules include speakers, microphones, cameras, and the like. In some embodiments, the accessory may comprise one or more sensors such as an accelerometer, orientation sensor, altimeter, light sensor and the like. The controller may be configured to control and coordinate the functioning of the various input/output modules and sensors. The controller may be further configured to process data received from the input modules or sensors and provide data for output to the output modules.

In some embodiments, the accessory comprises one or more batteries for providing power to the accessory. The accessory may be configured to function with rechargeable, non-rechargeable batteries, or both. The accessory may be further configured to derive power from AC or DC line power. A worker skilled in the art will be readily familiar with interfaces and techniques for enabling battery or line power connections to the accessory. In some embodiments, the accessory may be further configure to provide or obtain power from a connected mobile device or other external device.

In some embodiments, the accessory comprises a mounting component for mounting the accessory on a surface such as a wall, windshield, dashboard and the like. A worker skilled in the art will be familiar with various mechanisms for enabling mounting of an object to a substantially vertical surface. Examples of mounting mechanisms that may be included on the mounting component include hooks, Velcro™, suction cups and the like. Mounting of the accessory enables it to be used in a hand-free manner. This feature would be useful for example, when the user is engaged in activities such as driving, cooking and the like where the user's hands are otherwise occupied.

Hinged Accessory/Dual Touchscreen Display

In some embodiments, the accessory is a hinged accessory. FIG. 5 shows a side view of an exemplary hinged accessory in accordance with some embodiments of the present invention. The hinged accessory 500 comprises a first portion 510 and a second portion 520 connected by a hinge 530. The first 510 and second 520 portions each have an inner surface (510*a*, 520*a*) and an outer surface (510*b*, 520*b*). The first and second portions each have an inner edge (510*c*, 520*c*) proximate the hinge and an outer edge (510*d*, 520*d*) opposite to the inner edge (510*c*, 520*c*). At least one of the inner surfaces (510*a*, 520*a*) has a touchscreen mounted thereon. The hinge 530 enables the first and second portions (510, 520) to rotate relative to one another. In the embodiment of FIG. 5, a touchscreen is mounted on each of the inner surfaces (510*a*, 520*a*) of the first and second portions (510, 520). FIG. 5*a* shows the accessory with the first and second portions (510, 520) at an angle of 0° relative to one another such that the inner surfaces (510*a*, 520*a*) of the first and second portions are hidden from view. The touchscreens on the inner surfaces are thus protected when the accessory is in this folded configuration. FIG. 3*b* shows the accessory with the first and second portions (510, 520) at an angle of 180° relative to one another such that the inner surfaces (510*a*, 520*a*) of the first and second portions are adjacent one another on either side of the axis of rotation.

In some embodiments, the first and second portions (510, 520) of the accessory are rotatable to a maximum relative angular position of 180° (where the first and second portions are at an angle of 180° between them). In some embodiments, the first and second portions (510, 520) of the accessory are rotatable to a maximum relative angular position of 360°. In some embodiments, the first and second portions of the accessory are capable of remaining in a plurality of relative angular positions between 0° and the maximum angular position. FIG. 5*c* shows the accessory with the first and second portions (510, 520) in an relative angular position of 90°. FIG. 5*d* shows an exemplary embodiment, where the first and second portions (510, 520) have been rotated to form an angle of 360° between them.

In some embodiments, the touchscreen display is a single screen spanning the first and second portions. The single touchscreen display may be comprised of flexible material.

In some embodiments, the touchscreen display comprises a dual touchscreen display. In some embodiments, the first portion houses the first touchscreen of the dual touchscreen display and the second portion houses the second touchscreen of the dual touchscreen display.

FIG. 6 shows a top view of an exemplary embodiment of a hinged accessory with a dual touchscreen display. In some embodiments, as shown in FIG. 6, the first 615 and second 625 touchscreens extend to the inner edges of the first and second portions (610, 620) so as to form a substantially continuous touchscreen. In some embodiments, the adjacent first and second (615, 625) touchscreens function as an integrated touchscreen to display information and accept user input continuously across the two screens. In some embodiments, the first and second touchscreens (615, 625) function individually as two distinct screens. In some embodiments, the first and second screens can function (615, 625) either as an integrated screen or as individual screens. In some embodiments, only one of the first and second touchscreens is active (on) while the other is inactive (off).

The functioning of the first and second screens as an integrated screen or individually as two distinct screens, and which of the two screens is active may be based on factors such as orientation of the accessory, relative angular position of the two screens, battery level, user preference, application or information being accessed on the screens and the like. For example, when the accessory is in a partially open or intermediate position, the screens may function as two distinct screens and when the accessory is in an open position (180° relative angular position), the two screens may function as an integrated screen. As another example, only the first screen may be active when the battery level is low. As yet another example, for the purpose of a videoconference on the accessory, the screens may function as an integrated screen while for entering text, the screens may function individually with one displaying text information and another displaying a keyboard for inputting text information.

In some embodiments, one or both portions of the accessory comprise an orientation sensor. The orientation sensor may be configured to determine whether the touchscreen displays are in landscape orientation or in portrait orientation as will be familiar to a worker skilled in the art. In some embodiments, the accessory comprises a sensor associated with the hinge for determining relative angular position of the first and second accessory portions.

In some embodiments, the screens function as an integrated screen or as distinct screens based on the angular position of the first and second portions. For example, when the angular position of the first and second portions is approximately 90°, the touchscreens may functions as distinct screens.

Figure 7A:
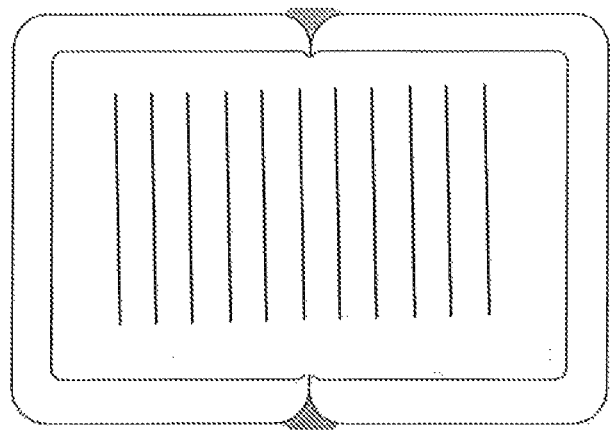
FIG. 7(*a*) shows an exemplary hinged dual touchscreen accessory with the dual touchscreens functioning as an integrated screen in accordance with some embodiments of the present technology.
Figure 7B:
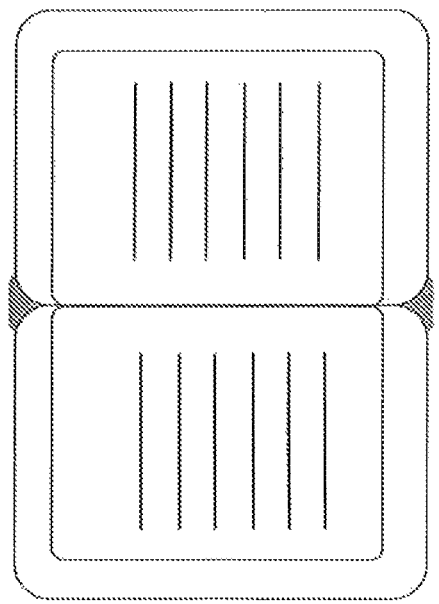

In some embodiments, the screens function as an integrated screen or as distinct screens based on the orientation of the touchscreens. In some embodiments, the screens function as an integrated screen or distinct screens based on the orientation of the touchscreens as well as the angular position of the first and second portions. For example, for displaying pages of an e-book when the angular position of the first and second portions is approximately 180° and the touchscreen displays are in a portrait orientation, a different page of the e-book may be displayed on each touchscreen display as shown in FIG. 7(*a*). Alternately, if the angular position of the first and second portions is approximately 180° and the orientation of the accessory is such that the touchscreens are in landscape orientation, a single page of the e-book may be displayed across the two screens as shown in FIG. 7(*b*).

A worker skilled in the art will readily understand that the output for display may need to be reconfigured to suit the different orientations of the touchscreens and angular positions of the first and second portions. Reconfiguration may comprise resizing of objects or images, repositioning of objects or images and optionally reformatting of images to suit the different display orientations. For example, when the screens are changed from a portrait to a landscape orientation, an array of icons or folder on the screen may be rearranged to suit the aspect ratio of the screen. A worker skilled in the art will be readily familiar with suitable resizing, repositioning and reformatting schemes and methods.

Mobile Device

The method described herein can be implemented to remotely operate a mobile device having appropriate communication capabilities, such as voice communication capabilities, data communication capabilities, or a combination thereof. The term "mobile device", for the purposes of this specification, shall include any wireless handheld, smart phone, PDA, or other communications device that is capable of transmission and reception of data via a wireless communication medium such as radio.

Figure 8:
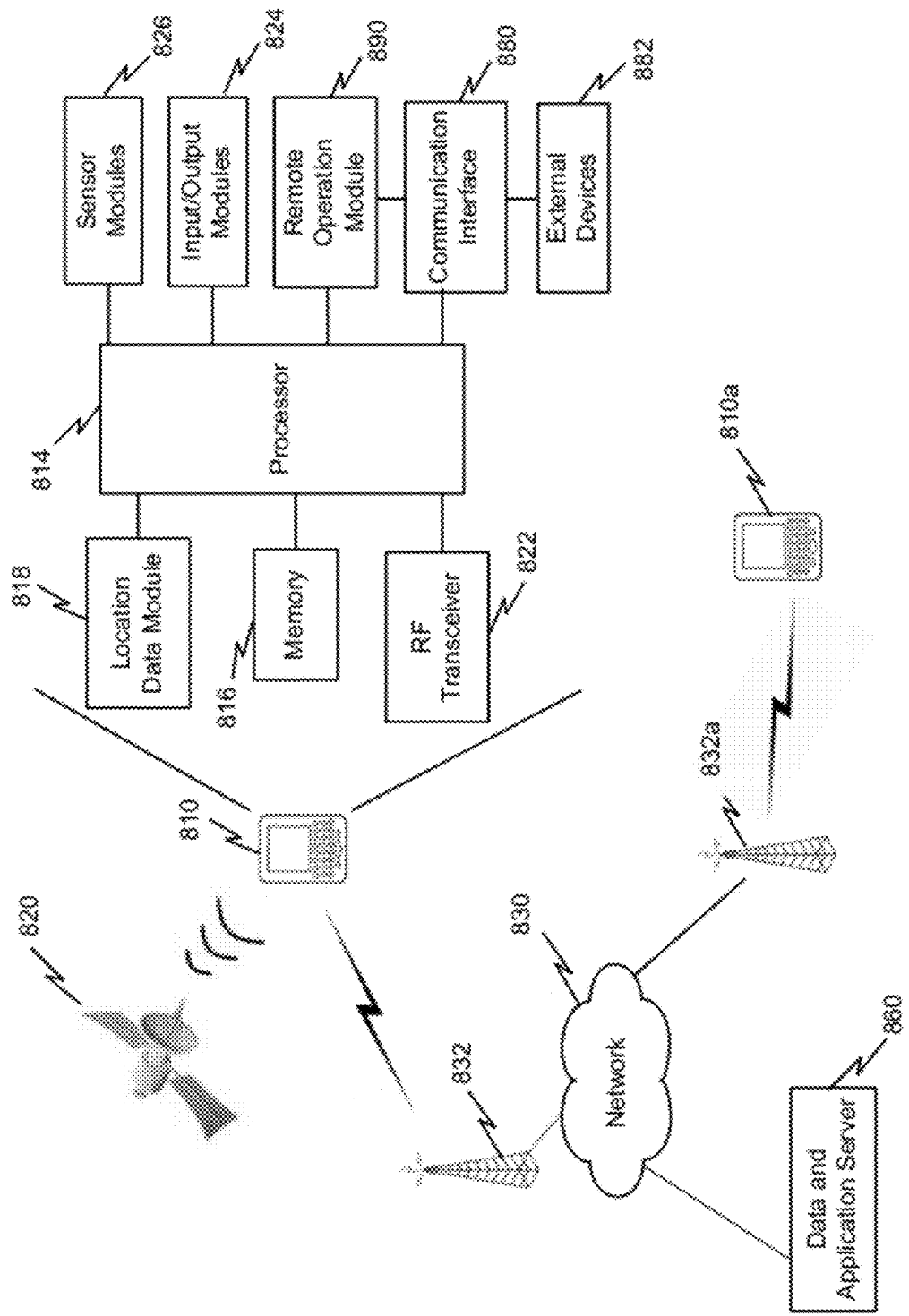
FIG. 8 is an illustration of an example wireless communications device in accordance with some embodiments of the present technology.

FIG. 8 is a block diagram depicting certain main components of an exemplary mobile device. It should be understood that this figure is intentionally simplified to show only certain components; the device may include other components beyond those shown in FIG. 8.

The device 810 comprises a microprocessor 814 (or simply a "processor") and operatively associated memory 816 (in the form of RAM or flash memory or both), to enable a variety of device functions and to execute an operating system for running software applications loaded on the device.

The mobile device 810 includes a radiofrequency (RF) transceiver 822 for communicating wirelessly with the base station 832 of a wireless network 830. The base station 832 may be a cellular base station, wireless access point, or the like. The base station 832 may vary as the mobile device travels, for example, using well-known handoff processes in cellular networks. The RF transceiver 822 may optionally be alternatively or additionally used for communicating directly with a peer device such as a third party mobile device, for example as may occur in some ad-hoc networks. The RF transceiver enables access to a wireless communication channel for transmitting and receiving data. The RF transceiver 822 may further allow for a wireless voice channel for transmitting and receiving voice communications, for example concurrently with transmission and reception of data over the same or a separate logical or physical channel.

The mobile device 810 sends and receives communication signals via the RF transceiver 822. When communicating wirelessly with a base station 832 of a wireless network 330, the mobile device 810 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, 4G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the mobile device 310 may be capable of operation using multiple protocols. The base station 832 may be part of a wireless network, such as a cellular network, local-area network, wide-area network, wireless hotspot network, or the like. The mobile device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

The mobile device 810 is operatively associated with a GPS system 820 allowing for determining its location. The mobile device 810 is linked to a cellular network 830 through a base-station 832, and thereby to one or more servers of a service and application provider, and to one or more servers of a data and content provider. Additional mobile devices 810*a* may be linked to the cellular network 830 using the same base station 832 or a separate base station 832*a*. The cellular network 830 thus serves for data transfer between peer mobile devices 810, 810*a*.

The mobile device 810 further comprises a location data module 818, which is configured to determine the location of the mobile device. In this embodiment, the location data module 818 includes a GPS receiver chipset for receiving GPS radio signals transmitted from the one or more orbiting GPS satellites 820. The GPS receiver chipset can be embedded within the device or externally connected, such as, for example, a Bluetooth™ GPS puck or dongle. Other systems for determining location may be used in place of GPS, as would be readily understood by a worker skilled in the art.

Although in some implementations of the present technology GPS receivers are used to determine the current location of each device, it should be appreciated that other techniques can be used to determine the current location to a degree of accuracy commensurate with the technique used. For example, cell tower triangulation or radiolocation techniques, as mentioned above, can be used to generate the current location for the device. Alternatively, the identity (and location) of the cell tower handling the device's communications can be used as a proxy for the location of the device. Another approach would be to prompt the user of the device to enter his or her current location (e.g. entering a street address, picking a POI from a map or selecting the current location using crosshairs on a map). As yet another example, Global Navigation Satellite Systems (GNSS) or pseudo-satellite systems other than or in addition to the currently deployed GPS system may be used. For example, GLONASS, Beidou, COMPASS, Galileo, or like systems may be utilized for positioning. Satellite-based, regional, or network-based augmentation or improvement systems such as WAAS and A-GPS may also be utilized to aid in positioning.

Referring to FIG. 8, the mobile device 810 is linked to data and application servers 860 which may include public or private servers. The servers may include map servers that provide map data to networked computing devices or mobile devices upon request, for example, in vector format or raster format. In addition to providing the map data, the servers (e.g. the map servers) can also provide route instructions or route directions which are turn-by-turn instructions for each decision point along the route.

The mobile device comprises one or more input/output devices or user interfaces (UI's) 824. The mobile device 810 may include one or more of the following: a display (e.g. a small LCD screen), a thumbwheel and/or trackball, a keyboard, a touch screen, a keypad, a button, a speaker, a still camera and a video camera. The mobile device comprises one or more sensor modules 826 including but not limited to a microphone, an orientation sensor, an accelerometer, a light sensor etc.

The mobile device comprises a communication interface 880 for communication with external devices 882. The communication interface may comprise short-range communication modules for communication between the mobile device and other similarly enabled external devices 882. For example, short-range communication modules 880 may include a Bluetooth communication module for communicating with a car stereo or external display.

The mobile device further comprises a remote operation module 890 operatively connected to the microprocessor for enabling remote operation of a mobile device by an accessory. The remote operation module 890 is configured to receive one or more control signals from a remote accessory via the communication interface 882 and initiate one or more actions based at least in part on the one or more control signals.

Implementations of the present technology will now be further explained with regard to the example scenarios. It should be expressly understood that these scenarios are only examples that are provided solely for the purposes of illustrating how the technology works in certain circumstances. Accordingly, these examples should not be construed as limiting any of the aspects of the technology already described above and claimed in the appended claims.

Figure 9:
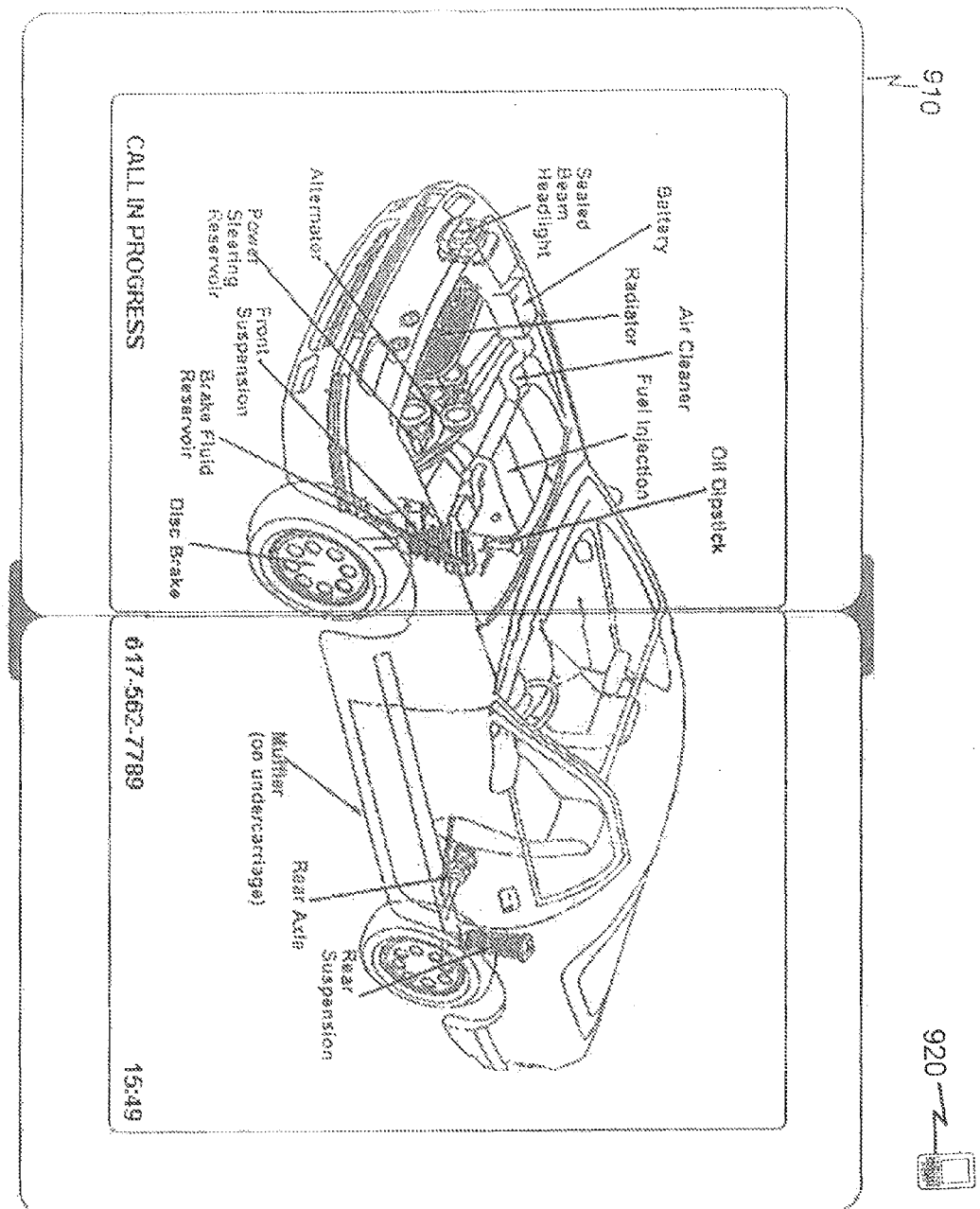
FIG. 9 is an example scenario involving remote operation of a mobile device using an accessory in accordance with some embodiments of the present technology.

Consider first the example scenario depicted schematically in FIG. 9. The accessory is generally shown as 910 and is linked to the mobile device 920 by means of a wireless connection. The user is attempting to diagnose and perform repairs on the car's engine. The user accesses a website that offers easy step-by-step instructions and tips for diagnosing, trouble-shooting and fixing cars. The user takes the accessory 910 into the garage while the mobile device 920 remains in the kitchen. While performing repair work on the car, the user makes a phone call to a phone number listed on the website to obtain the services of the live mechanic for diagnosing the problem. The user pulls up the numeric keyboard on the touchscreen and places the call. When speaking with the mechanic, the user securely mounts the accessory 910 on a stool next to the car where he can clearly view the screen, hear the speaker and speak into the microphone. The user simultaneously has the website open on the accessory screen and can navigate through the pages while verbally consulting with the mechanic. Optionally, the user can also use the camera to engage in a video-conference with the mechanic who can lead him through the various steps of the diagnosis and repair.

Figure 10:
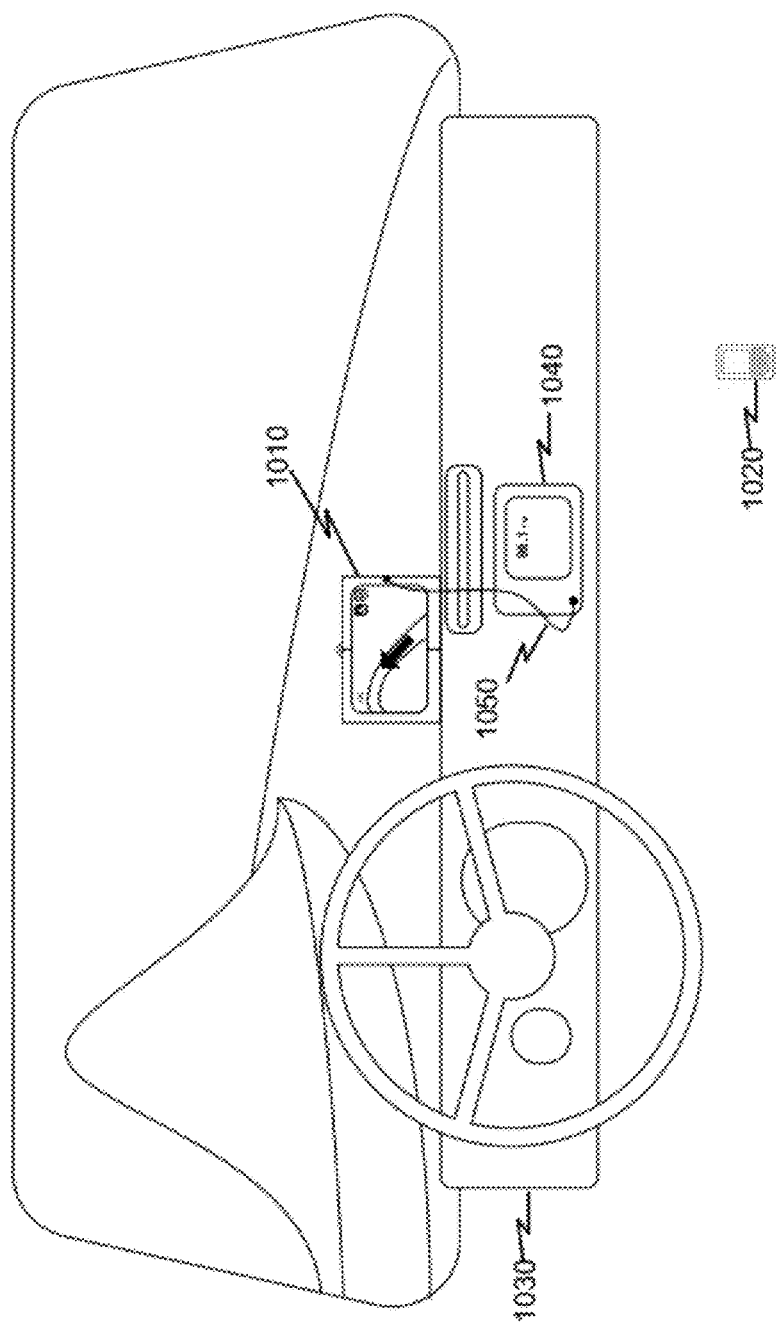
FIG. 10 is an example scenario involving remote operation of a mobile device using an accessory in accordance with some embodiments of the present technology.

Another example scenario is depicted schematically in FIG. 10. The accessory is generally shown as 1010 and is linked to the mobile device 1020 by means of a wireless connection. The user is in a car and using the GPS and navigation functionality of the mobile device to obtain driving directions. In this figure the mountain and other features of the external environment are illustrated as would be seen through the wind screen.

The accessory 1010, comprising a hinged dual touchscreen mounted on the dashboard 1030 while the mobile device 1020 rests on the passenger seat. The mobile device may also be in a storage area or in a mobile device dock. The map and navigation directions are displayed on the accessory screen. The accessory further comprises a speaker, microphone and camera.

The accessory is further linked to the car's on-board entertainment system 1040 allowing it to stream radio content via the speaker of the accessory, so that entertainment audio may be interrupted for audio navigation instructions. In this example scenario, the car stereo and accessory are linked via a wired connection 1050. The accessory may be further linked to the car's back-up camera to receive images from the back-up camera for assisting in back-up and parking functions. In this example scenario, the car's back-up camera and accessory are linked via a wireless connection.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. An accessory configured for remote operation of a mobile device, the accessory comprising:
   a touchscreen display configured to display output information to a user and receive user input;
   a communication interface configured to send and receive data to and from the mobile device; and
   a controller operatively coupled to the touchscreen display and the communication interface, the controller further configured to generate one or more control signals for transmission to the mobile device, the one or more control signals configured to initiate one or more actions on the mobile device and generated, at least in part, based on user input received on the accessory wherein the accessory comprises a first portion and a second portion connected by a hinge,
   wherein the first and second portions are rotatable relative to one another, and
   wherein one or both of the first and second portions comprises a touchscreen display.

2. The accessory of claim 1, wherein the accessory is further configured to store data on the accessory during remote operation of the mobile device by the accessory.

3. The accessory of claim 2, wherein the accessory is further configured to delete said data stored on the accessory when the accessory is disconnected from the mobile device.

4. The accessory of claim 3, wherein the accessory is further configured to transfer said data stored on the accessory to the mobile device before deleting said data.

5. The accessory of claim 1 wherein the communication interface comprises one or more short-range communication modules.

6. The accessory of claim 1 wherein the communication interface is configured for secure communication with the mobile device.

7. The accessory of claim 1 further comprising one or more input modules for receiving user input.

8. The accessory of claim 1 further comprising one or more output modules for outputting information.

9. The accessory of claim 1 wherein the controller is configured to process the received user input and provide the processed user input to the mobile device via the first communication interface.

10. The accessory of claim 1 wherein the controller is configured to process data received from the mobile device and provide the processed data to the touchscreen module for presentation to a user.

11. The accessory of claim 1, wherein the first portion comprises a first touchscreen display and second portion comprises a second touchscreen display, and wherein the first and second touchscreen form a continuous screen when the first and second portions are at an angle of 180° relative to one another.

12. The accessory of claim 11, wherein the first and second touchscreens function as an integrated touchscreen.

13. The accessory of claim 1, wherein the first and second touchscreens function as an integrated touchscreen at least partly based on the relative angular position of the first and second portions.

14. The accessory of claim 1, wherein the first and second touchscreens function as an integrated touchscreen at least partly based on the orientation of the first and second portions.

* * * * *